US012608773B2

(12) United States Patent
Lin et al.

(10) Patent No.: US 12,608,773 B2
(45) Date of Patent: Apr. 21, 2026

(54) ULTRASOUND IMAGE ENHANCEMENT PROCESSING SYSTEM AND METHOD THEREOF

(71) Applicant: ioNetworks INC., New Taipei City (TW)

(72) Inventors: Ting Lin, New Taipei City (TW); Chih-Hung Wang, New Taipei City (TW); Ming-Hsiao Yao, New Taipei City (TW); Kuan-Chieh Wang, New Taipei City (TW); Szu-Tien Yu, New Taipei City (TW)

(73) Assignee: IONETWORKS INC., New Taipei City (TW)

( * ) Notice: Subject to any disclaimer, the term of this patent is extended or adjusted under 35 U.S.C. 154(b) by 277 days.

(21) Appl. No.: 18/371,877

(22) Filed: Sep. 22, 2023

(65) Prior Publication Data

US 2025/0104195 A1    Mar. 27, 2025

(51) Int. Cl.
*G06T 5/70* (2024.01)

(52) U.S. Cl.
CPC ...... *G06T 5/70* (2024.01); *G06T 2207/10132* (2013.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2019/0295295 A1* | 9/2019 | Hyun | A61B 8/5215 |
| 2020/0380641 A1* | 12/2020 | Higaki | G06N 3/045 |
| 2021/0027430 A1* | 1/2021 | Yamamoto | G06T 7/0012 |
| 2023/0095184 A1* | 3/2023 | Takada | G06T 5/60 |
| | | | 382/275 |
| 2024/0386531 A1* | 11/2024 | Zhuang | G06T 5/60 |

FOREIGN PATENT DOCUMENTS

| CN | 116523790 A | * | 8/2023 | ... | G06N 3/0455 |

* cited by examiner

*Primary Examiner* — Jiangeng Sun
(74) *Attorney, Agent, or Firm* — LANWAY IPR SERVICES; Chun-Ming Shih

(57) ABSTRACT

The present invention relates to an ultrasound image enhancement processing system and method thereof. The ultrasound image enhancement processing system includes at least one first ultrasound device and at least one server apparatus. The server apparatus receives a first ultrasound original image file, processes the first ultrasound original image file through a speckle reduction algorithm to generate a first processed image file, and performs a deep learning training on the first ultrasound original image file and the first processed image file to generate a first neural network model. The first neural network learning module is used to output a first speckle reduction enhancement image file. The image content of the first speckle reduction enhancement image file is approximating to the image content of the first processed image file.

8 Claims, 15 Drawing Sheets

ULTRASOUND IMAGE ENHANCEMENT PROCESSING SYSTEM AND METHOD THEREOF

BACKGROUND OF THE INVENTION

Field of the Invention

The present invention relates to an ultrasound image enhancement processing system and its method, in particular to an ultrasound image enhancement processing system and its method to replace the conventional speckle reduction algorithm.

Description of the Related Art

Ultrasonic imaging is widely used in clinical medical imaging examinations because of its high safety, non-invasive, non-radioactive, and real-time imaging characteristics. However, ultrasound imaging is inherently limited due to its imaging principle. In order to improve the image quality and the correctness of human interpretation, the original image is generally processed by speckle reduction, and the traditional noise reduction processing algorithm is designed manually, so it has its own defects.

For edge-end devices with low CPU computing power, it may be difficult to port the conventional algorithms. With the development of AI, there are now many hardware chips that can support AI computing acceleration. Even on edge devices, many models can achieve real-time processing speeds. Leveraging deep learning neural networks to learn the existing speckle reduction processing algorithms, converting multiple steps into single model inference, convert CPU operations into neural network operations which can be benefited from GPU/DSP acceleration, and reduce the difficulty of porting the algorithms to edge devices.

In addition, for different ultrasound devices, due to differences between hardware and front-end image processing methods, the obtained image characteristics may be slightly different. Established image processing methods (conventional speckle reduction algorithms) may not be effective when applied to new ultrasound devices. By using neural networks, it's possible to increase the degree of image enhancement without increasing computation time.

Therefore, the subject application uses the method of converting the algorithm of ultrasound image enhancement into a deep learning model. Through deep learning, the neural network can learn the behavior of the ultrasound image enhancement algorithm, and convert multiple steps into a single model inference, which can be benefited from hardware acceleration. In addition, it proposes a method for adjusting images of different ultrasound devices without changing the existing algorithm. Therefore, the present invention should be an optimal solution.

BRIEF SUMMARY OF THE INVENTION

The ultrasound image enhancement processing system of the present invention includes: at least one first ultrasound device, used to generate a first ultrasound original image file: at least one server apparatus, used to receive the first ultrasound original image file, wherein the server apparatus at least comprises: a speckle reduction processing module, used to process the first ultrasound original image file through a speckle reduction algorithm to generate a first processed image file: a first neural network learning module, connected to the speckle reduction processing module, performing a deep learning training on the first ultrasound original image file and the first processed image file to generate a first neural network model; and a first speckle reduction enhancement output module, connected to the first neural network learning module, used to input the first ultrasound original image file into the first neural network model to output a first speckle reduction enhancement image file.

More specifically, the image content of the first speckle reduction enhancement image file is approximating to the image content of the first processed image file.

More specifically, the speckle reduction algorithm is an algorithm that can reduce speckle and preserve image structure without changing image resolution. The speckle reduction algorithm is an algorithm constructed based on an image processing theory or composed of a series of algorithms.

More specifically, the first neural network model uses the residual network block to improve the UNet structure.

More specifically, the server apparatus further comprises a training correction module. The training correction module is connected to the speckle reduction processing module, the first neural network learning module and the first speckle reduction enhancement output module. The training correction module is used to calculate a loss function after normalizing the first processed image file and the first speckle reduction enhancement image file, wherein the loss function is calculated by dividing the image into small blocks and then comparing the structural similarity to evaluate a learning error value of the first neural network model.

The ultrasound image enhancement processing system of the present invention includes: at least one first ultrasound device, used to generate a first ultrasound original image file: at least one second ultrasound device, used to generate a second ultrasound original image file: at least one server apparatus, used to receive the first ultrasound original image file and the second ultrasound original image file, wherein the server apparatus at least comprises: a speckle reduction processing module, used to process the first ultrasound original image file through a speckle reduction algorithm to generate a first processed image file: a first neural network learning module, connected to the speckle reduction processing module, performing a deep learning training on the first ultrasound original image file and the first processed image file to generate a first neural network model: a first speckle reduction enhancement output module, connected to the first neural network learning module, used to input the first ultrasound original image file into the first neural network model to output a first speckle reduction enhancement image file, and input the second ultrasound original image file into the first neural network model to output a second processed image file: an image enhancement processing module, connected to the first speckle reduction enhancement output module, used to process the second processed image file through an image enhancement algorithm to generate a third processed image file; a second neural network learning module, connected to the first speckle reduction enhancement output module, used to perform a deep learning training on the second ultrasound original image file and the third processed image file to generate a second neural network model; and a second speckle reduction enhancement output module, connected to the second neural network learning module, used to input the second ultrasound original image file into the second neural network model to output a second speckle reduction enhancement image file.

More specifically, the image content of the first speckle reduction enhancement image file is approximating to the image content of the first processed image file, and the image content of the second speckle reduction enhancement image file is approximating to the image content of the third processed image file.

More specifically, the server apparatus further comprises a training correction module. The training correction module is connected to the speckle reduction processing module, the first neural network learning module, the first speckle reduction enhancement output module, the image enhancement processing module, the second neural network learning module and the second speckle reduction enhancement output module, wherein the training correction module is used to calculate a loss function for the first processed image file, the first speckle reduction enhancement image file, the third processed image file and the second speckle reduction enhancement image file after normalizing the first processed image file, the first speckle reduction enhancement image file, the third processed image file and the second speckle reduction enhancement image file, wherein the loss function is calculated by dividing the image into small blocks and then comparing the structural similarity to evaluate the first neural network model and a learning error value of the first neural network model.

More specifically, the image enhancement algorithm uses a traditional image processing method or a deep learning model to perform image processing on the second processed image file to generate the third processed image file.

An ultrasound image enhancement processing method includes the steps of:

(1) generating a first ultrasound original image file through a first ultrasound device;

(2) receiving the first ultrasound original image file through a server apparatus, and processing the first ultrasound original image file through a speckle reduction algorithm to generate a first processed image file;

(3) performing a deep learning training on the first ultrasound original image file and the first processed image file to generate a first neural network model;

(4) inputting the first ultrasound original image file into the first neural network model to output a first speckle reduction enhancement image file, wherein image content of the first speckle reduction enhancement image file is approximating to image content of the first processed image file.

An ultrasound image enhancement processing method includes the steps of:

(1) generating a first ultrasound original image file through a first ultrasound device;

(2) generating a second ultrasound original image file through a second ultrasound device;

(3) receiving the first ultrasound original image file and the second ultrasound original image file through a server apparatus, and processing the first ultrasound original image file through a speckle reduction algorithm to generate a first processed image file;

(4) performing deep learning training on the first ultrasound original image file and the first processed image file to generate a first neural network model:

(5) inputting the first ultrasound original image file into the first neural network model to output a first speckle reduction enhancement image file, wherein the image content of the first speckle reduction enhancement image file is approximating to the image content of the first processed image file;

(6) inputting the second ultrasound original image file into the first neural network model to output a second processed image file, and processing the second processed image file through an image enhancement algorithm to generate a third processed image file;

(7) performing deep learning training on the second ultrasound original image file and the third processed image file to generate a second neural network model;

(8) inputting the second ultrasound original image file into the second neural network model to output a second speckle reduction enhancement image file, wherein the image content of the second speckle reduction enhancement image file is approximating to the image content of the third processed image file.

DETAILED DESCRIPTION OF THE INVENTION

Other technical contents, features and effects of the present invention will be clearly presented in the following detailed description of the preferred embodiment with reference to the drawings.

Figure 1A:
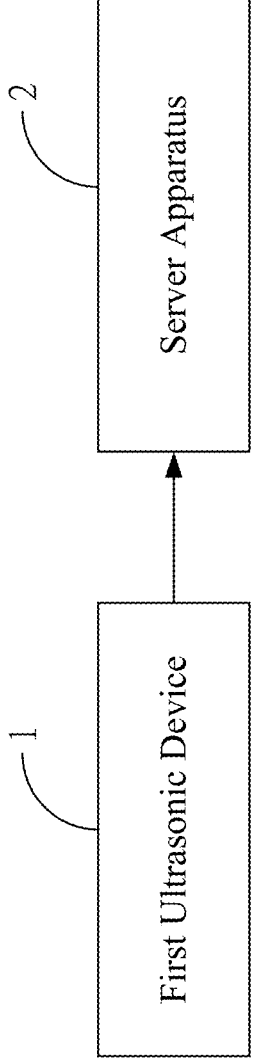
FIG. 1A is a schematic diagram of the overall structure according to the first embodiment of the ultrasound image enhancement processing system and its method of the present invention.

Please refer to FIG. 1A, which is a schematic diagram of the overall structure according to the first embodiment of the ultrasound image enhancement processing system and its method of the present invention. As can be seen from the figure, the ultrasound image enhancement system includes a first ultrasound device 1 and a server apparatus 2.

The first ultrasound device 1 can be used to scan organs, collect at least one B-mode ultrasound image of a specific human body part for at least one object, generate a first ultrasound original image file (X1), and transmit the first ultrasound original image file (X1) to the server apparatus 2 in a wireless or wired manner.

The image content of the first ultrasound original image file includes, but is not limited to, B-mode ultrasound images of the following common human body parts for diagnosis, such as thyroid, liver, kidney, musculoskeletal.

The first ultrasound device 1 collects images without using high compression rate storage to avoid unnatural compression distortion.

Figure 1B:
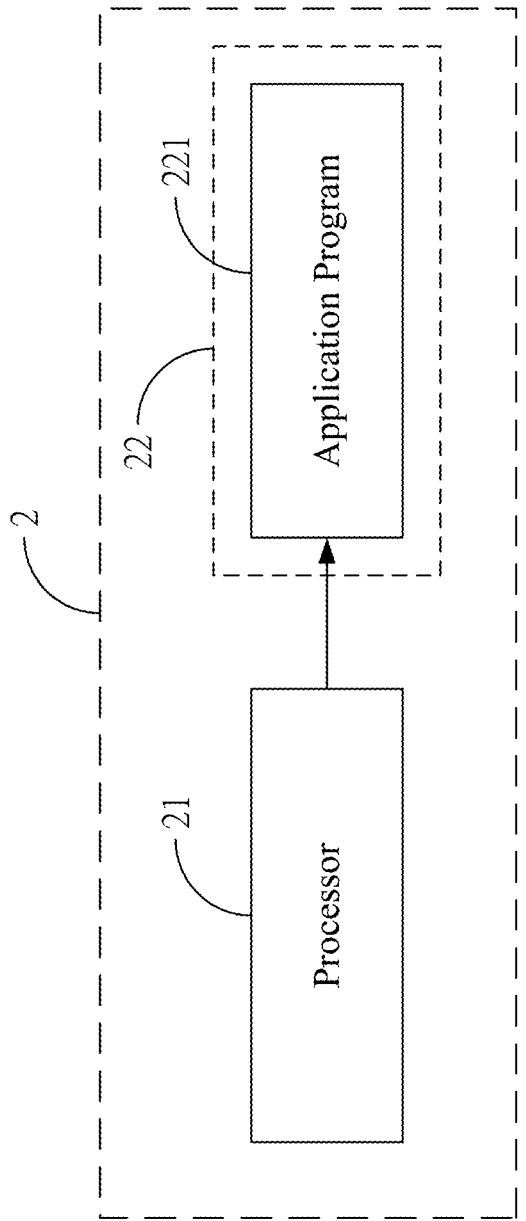
FIG. 1B is a schematic diagram of the server architecture according to the first embodiment of the ultrasound image enhancement processing system and its method of the present invention.

As illustrated in FIG. 1B, the server apparatus 2 includes at least one processor 21 and at least one computer-readable recording medium 22. The computer-readable recording medium 22 stores at least one application program 221. The computer-readable recording medium 22 further stores computer-readable instructions. When the computer-readable instructions are executed by the processors 21, the application program 221 can be operated accordingly.

Figure 1C:
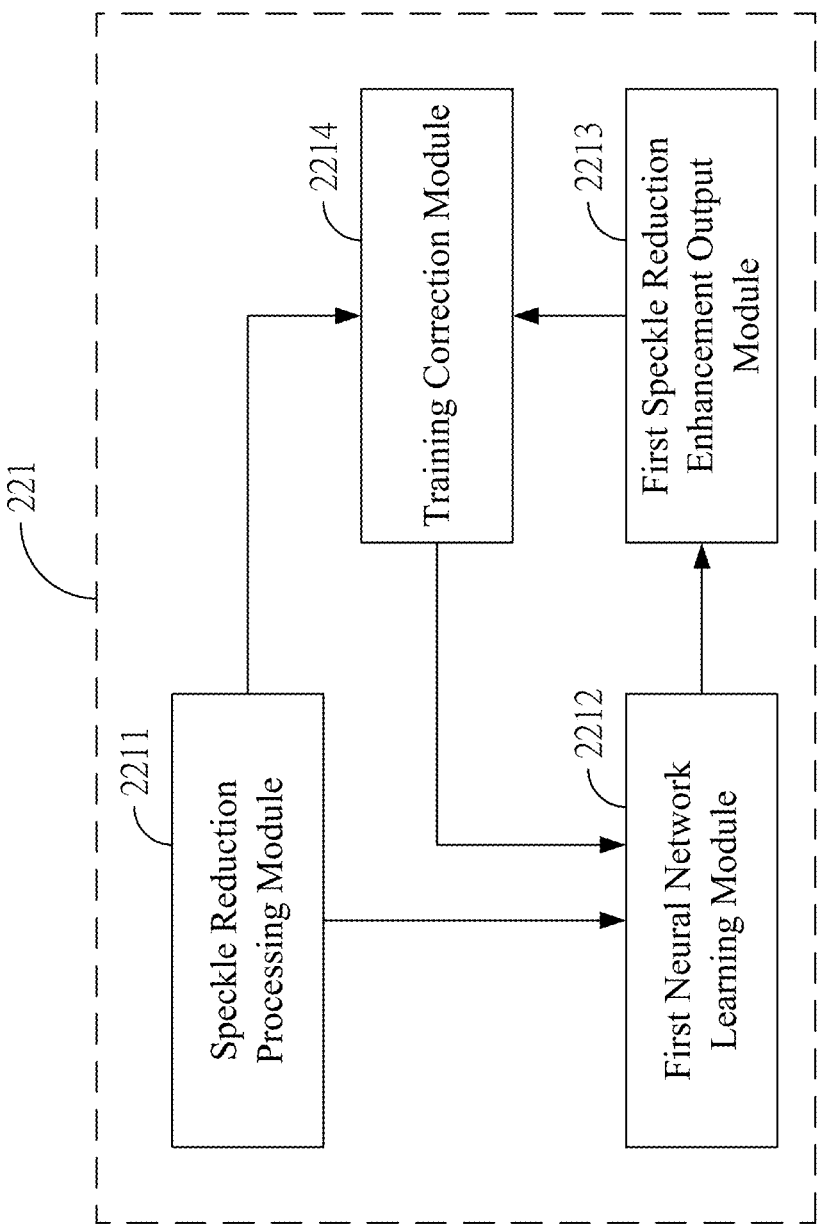
FIG. 1C is a schematic diagram of the application program according to the first embodiment of the ultrasound image enhancement processing system and its method of the present invention.

As illustrated in FIG. 1C, the application program 221 includes a speckle reduction processing module 2211, a first neural network learning module 2212, a first speckle reduction enhancement output module 2213 and a training correction module 2214.

The speckle reduction processing module 2211 is used to process the first ultrasound original image file (X1) through a speckle reduction algorithm to generate a first processed image file (Y1).

The speckle reduction algorithm is an algorithm that can reduce speckle and preserve the image structure without changing the image resolution.

The speckle reduction algorithm is used to reduce the speckle noise in the image, improve the image quality, reduce the noise but retain the structure in the image without changing the image resolution (for example, X1, Y1 are both 256×256 pixels).

The speckle reduction algorithm can be an algorithm constructed based on traditional image processing theory, a series of operations composed of multiple steps (for example, through a filter of a specific frequency and a filter of a spatial domain), or belongs to a third-party commercial algorithm which is not publicly available.

The first neural network learning module 2212 is connected to the speckle reduction processing module 2211 to perform deep learning on the first ultrasound original image file (X1) and the first processed image file (Y1) for training the convolutional neural network to generate a first neural network model.

Figure 2A:
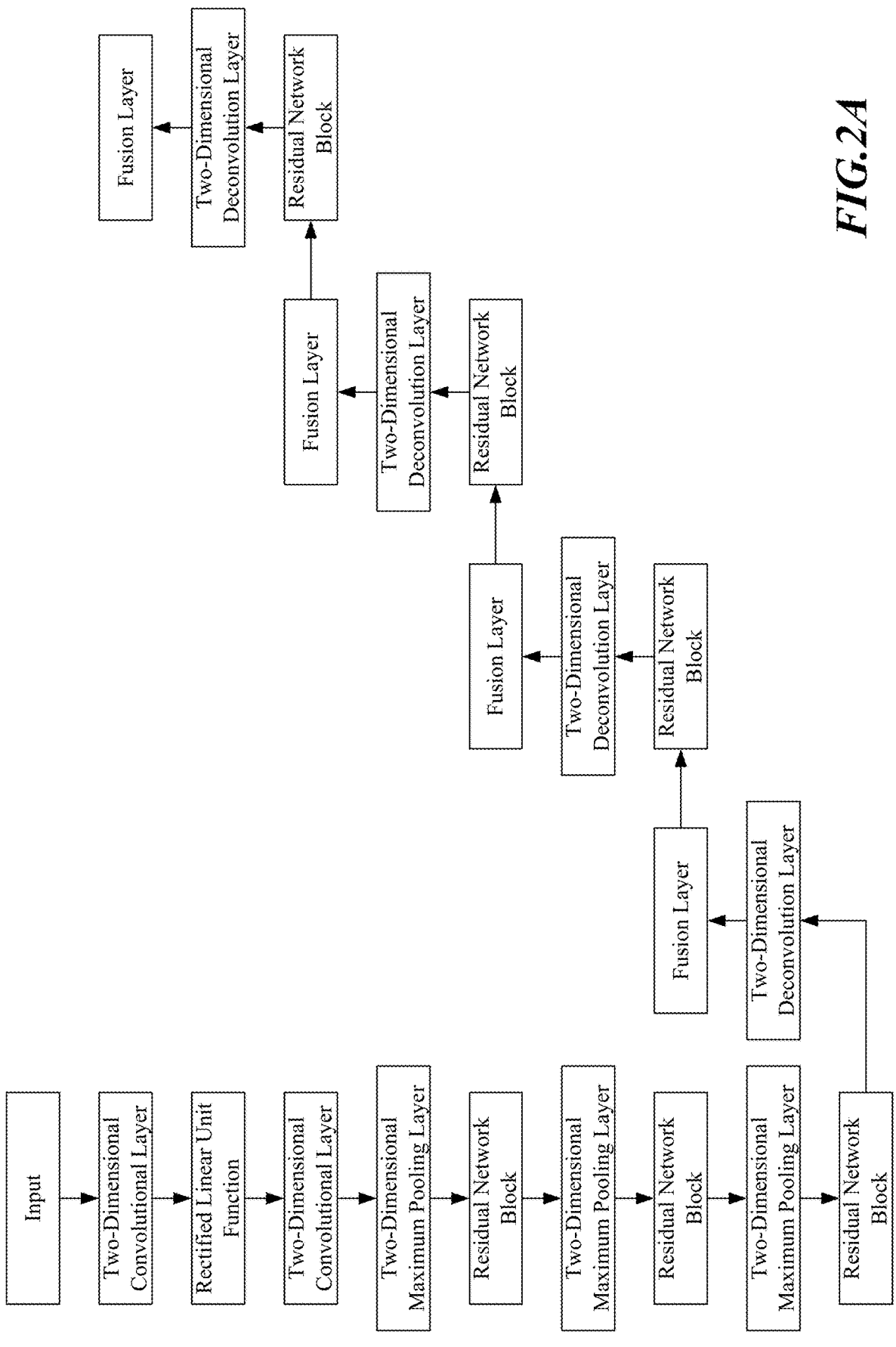
FIG. 2A is a schematic diagram of the neural network architecture of the ultrasound image enhancement processing system and its method of the present invention.
Figure 2B:
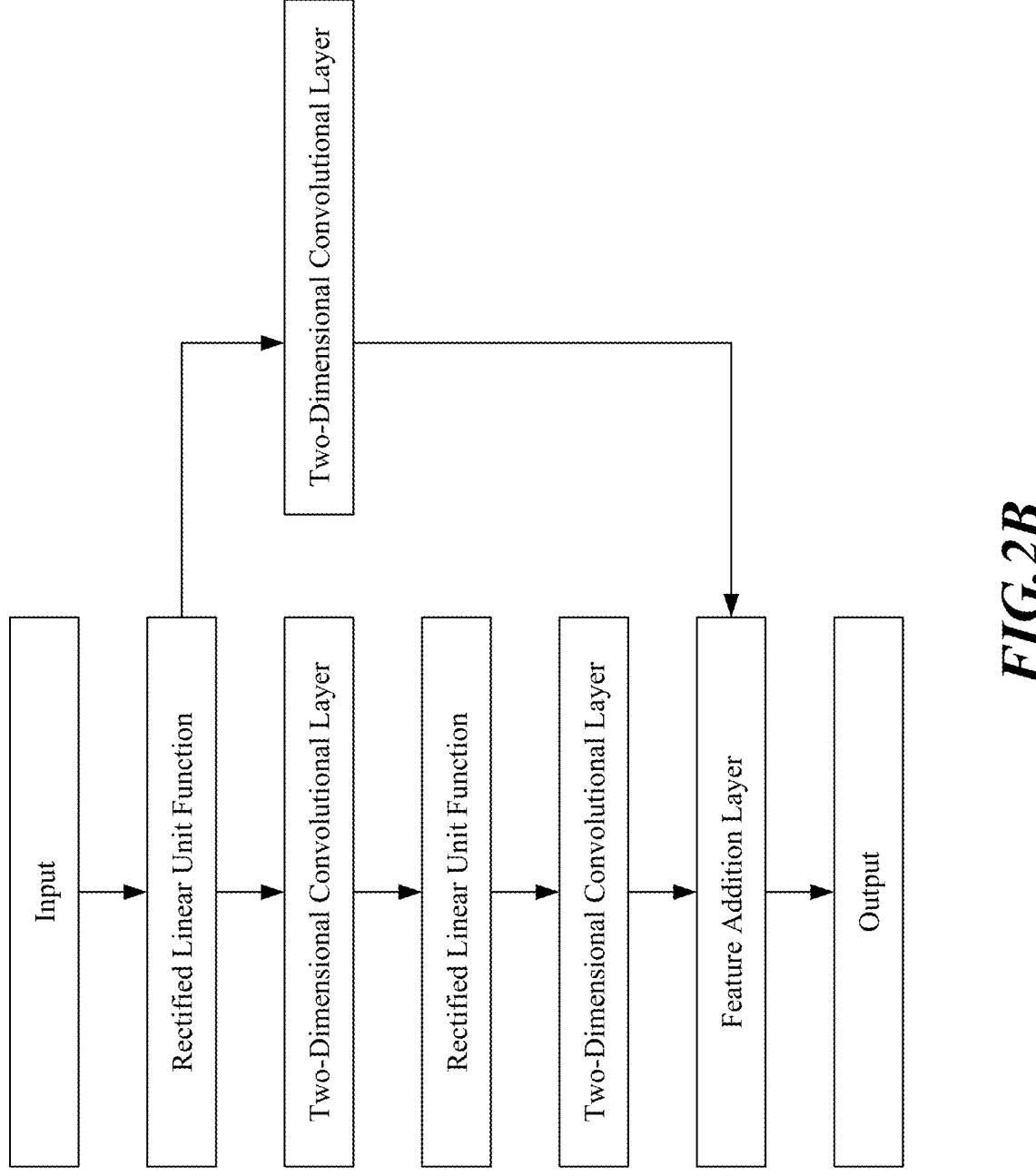
FIG. 2B is a schematic diagram of the residual network block architecture of the ultrasound image enhancement processing system and its method of the present invention.

The neural network architecture of the subject application is illustrated in FIG. 2A. The neural network of the subject application uses the UNet structure, but is not limited thereto. In the subject application, the residual network block (Residual block) is used to replace part of the convolutional layers of the original UNet to achieve better results. The structure of the residual network block (Residual block) is shown in FIG. 2B.

As illustrated in FIG. 2A, after the first ultrasound original image file (X1) is inputted, it passes through a two-dimensional convolutional layer (conv2D), a rectified linear unit function (ReLU), a two-dimensional convolutional layer (conv2D), a two-dimensional maximum pooling layer (MaxPooling2D), a residual network block (Residual block), a two-dimensional maximum pooling layer (MaxPooling2D), a residual network block (Residual block), a two-dimensional maximum pooling layer (MaxPooling2D), a residual network block (Residual block), a two-dimensional maximum pooling layer (MaxPooling2D), and a residual network block (Residual block).

In which, the two-dimensional convolution layer (conv2D) is fed into the fusion layer (Concatenate).

In which, the residual network block (Residual block) is fed into the fusion layer (Concatenate), the residual network block (Residual block), the two-dimensional deconvolution layer (TransposConv2D), and the fusion layer (Concatenate).

In which, the residual network block (Residual block) is fed into the fusion layer (Concatenate), the residual network block (Residual block), the two-dimensional deconvolution layer (TransposConv2D), the fusion layer (Concatenate), the residual network block (Residual block), the two-dimensional deconvolution layer (TransposConv2D), and the fusion layer (Concatenate).

In which, the residual network block (Residual block) is fed into the fusion layer (Concatenate), the residual network block (Residual block), the two-dimensional deconvolution layer (TransposConv2D), the fusion layer (Concatenate), the residual network block (Residual block), the two-dimensional deconvolution layer (TransposConv2D), the fusion layer (Concatenate), the residual network block (Residual block), the two-dimensional deconvolution layer (TransposConv2D), and the fusion layer (Concatenate).

In which, the residual network block (Residual block) is fed into the two-dimensional deconvolution layer (TransposConv2D), the fusion layer (Concatenate), the residual network block (Residual block), the two-dimensional deconvolution layer (TransposConv2D), the fusion layer (Concatenate), the residual network block (Residual block), the two-dimensional deconvolution layer (TransposConv2D), the fusion layer (Concatenate), the residual network block (Residual block), the two-dimensional deconvolution layer (TransposConv2D), and the fusion layer (Concatenate).

The architecture of the neural network of the subject application can replace a portion of the convolutional layers of the original UNet with the residual network block (Residual block), which provides a better effect. The residual network block can refer to FIG. 2B.

As illustrated in FIG. 2B, after the file is inputted, it passes through a rectified linear unit function (ReLU), a two-dimensional convolutional layer (conv2D), a rectified linear unit function (ReLU), a two-dimensional convolutional layer (conv2D), a feature addition layer (Add), and finally output.

In which, the rectified linear unit function (ReLU) will enter the two-dimensional convolution layer (conv2D), and then enter the feature addition layer (Add).

The first speckle reduction enhancement output module 2213 is connected to the first neural network learning module 2212 for inputting the first ultrasound original image file (X1) into the first neural network model to output a first speckle reduction enhancement image file (Z1).

The training correction module 2214 is connected to the first neural network learning module 2212 and the first speckle reduction enhancement output module 2213. The training correction module 2214 is used to normalize the input image (the first ultrasound original image file (X1)), convert a pixel value range to [0,1] interval, and obtain the output image through the network to calculate the loss function of the normalized image of the output image (the first speckle reduction enhancement image file (Z1)) and the learning target (the first processed image file (Y1)).

The loss function uses the MAE (mean absolute error) based on the image blocks and divides the image into 8×8 small blocks. Each block has a resolution of 32×32. The MAE is calculated for each block and averaged at the end. Blocks with average pixel values below and above 140 are ignored during the calculation process. Since the original image may contain areas that are close to full black or full white, ignoring these areas allows the model to focus on learning the important blocks.

At the end of each training epoch, the learning error of the model is evaluated by using SSIM (structural similarity index measure).

The Adam optimization algorithm is used in the subject application for training until the SSIM value reaches the highest value and remains stable, and then the model weights at that time will be stored to obtain the trained neural network.

In which, the learning rate is initially set to 0.001, and in each epoch the validation data set SSIM is checked. If the validation SSMI is not reduced after more than 5 epochs, the learning rate is reduced by multiplying it by 0.2, and the lower bound of the learning rate is 1% of the initial value. The number of batches for each training iteration is 2 pictures. In general, a larger batch size, such as 32 or 64, is selected when training the neural network. However, the model performance is better with a smaller number of batches, and thus batch size 2 is selected.

The neural network model in the subject application can strengthen the behavior of the algorithm. The output of the neural network of the subject application (the first speckle reduction enhancement image file (Z1)) is highly similar to the algorithm output (the first processed image file (Y1)) (SSIM>0.97). In the subject application, the original algorithm is converted into a neural network inference. Accordingly, the neural network can be used to replace the original algorithm, input the ultrasound images, and generate the speckle reduction enhancement image.

Figure 3C:
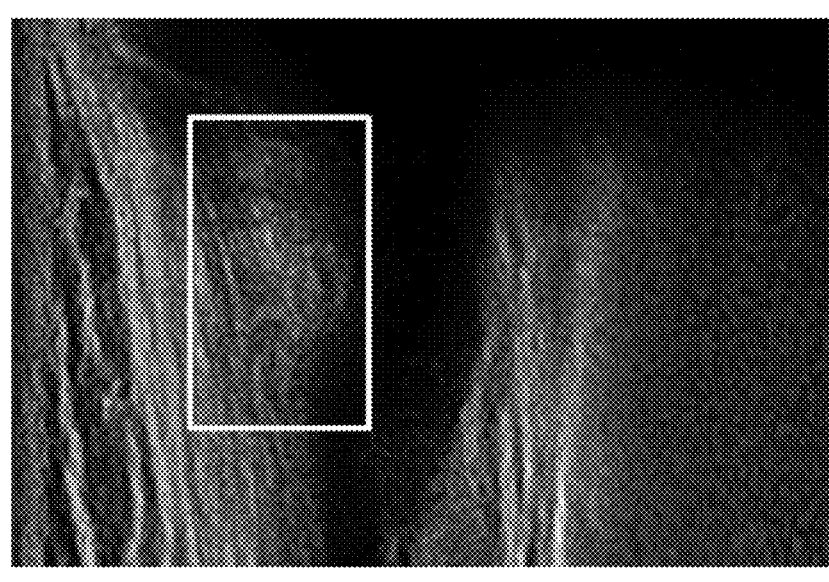
FIG. 3C is a schematic diagram of the image content of the first speckle reduction enhancement image file of the ultrasound image enhancement processing system and its method of the present invention.
Figure 3B:
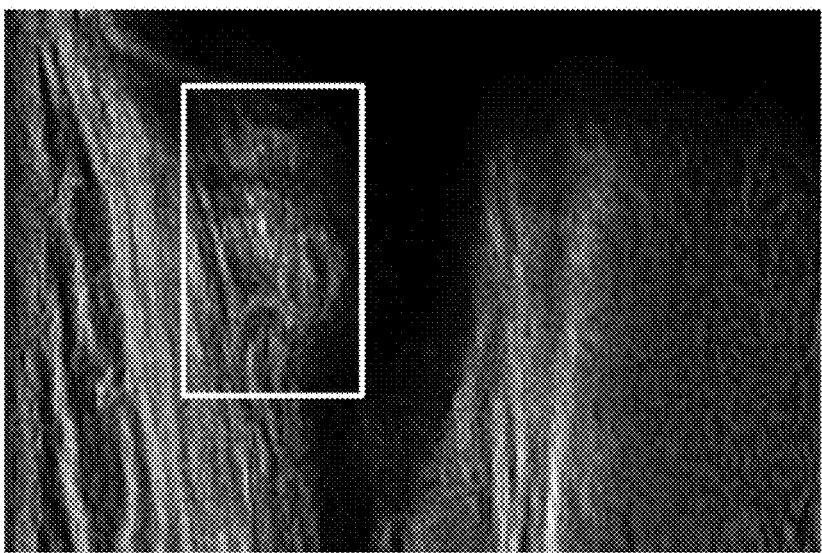
FIG. 3B is a schematic diagram of the image content of the first processed image file of the ultrasound image enhancement processing system and its method of the present invention.
Figure 3A:
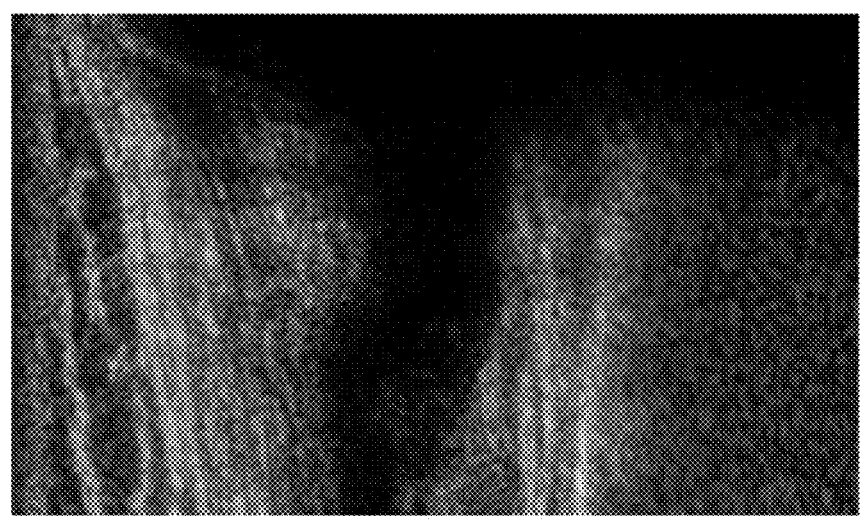
FIG. 3A is a schematic diagram of the image content of the first ultrasound original image file of the ultrasound image enhancement processing system and its method of the present invention.

As illustrated in FIG. 3A, it is the image content of the first ultrasound original image file.

As illustrated in FIG. 3B, it is the image content of the first processed image file.

As illustrated in FIG. 3C, it is the image content of the first speckle reduction enhancement image file.

It can be seen from FIGS. 3A~3C that the image content of the first speckle reduction enhancement image file is approximating to the image content of the first processed image file, and even retains more details in some areas (white boxes). The fixed image resolution is used when training the neural network, but the application for inference is not limited to a fixed image resolution. It can be extended to a higher image resolution (such as 256×256 for training, 512×512 for inference) based on requirements.

Figure 4:
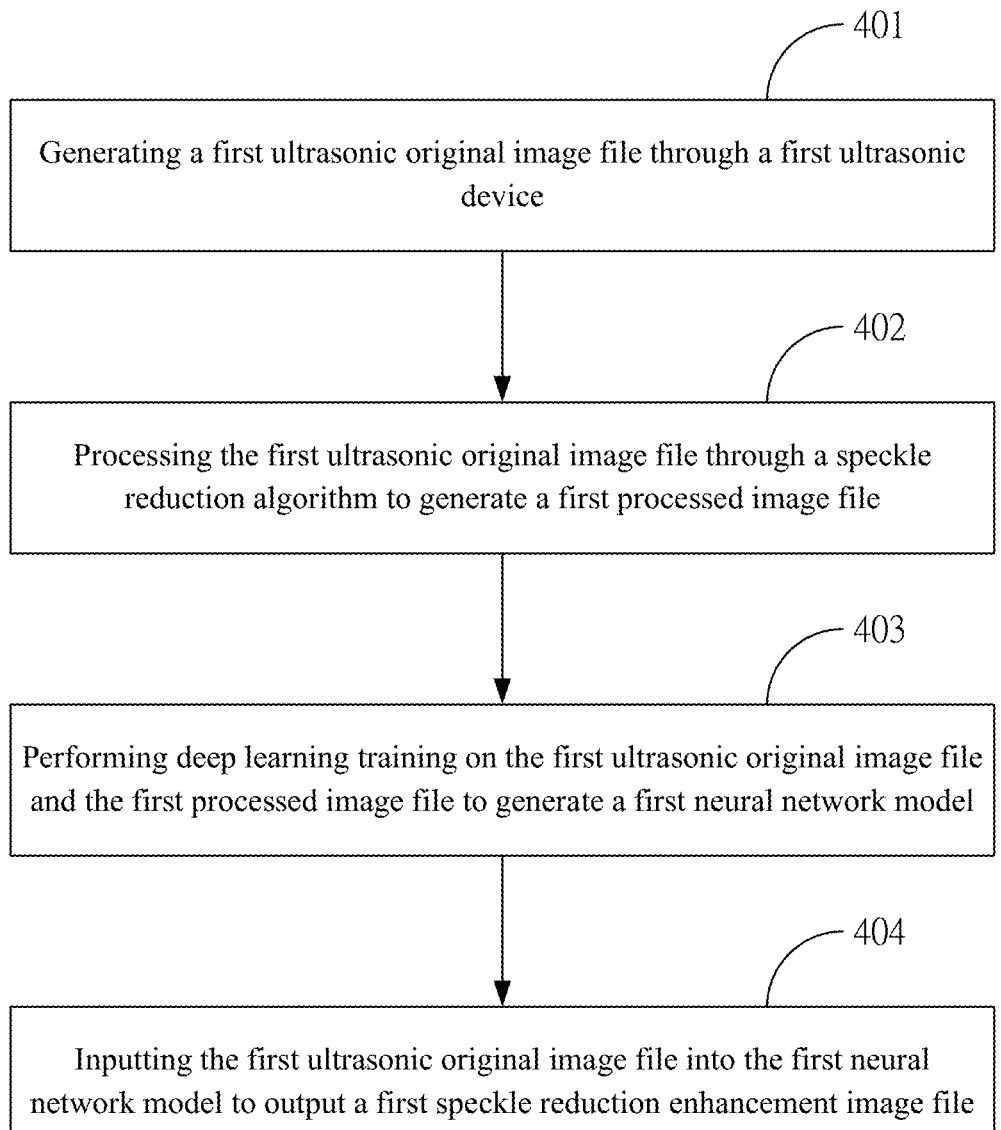
FIG. 4 is a schematic flow chart of the first embodiment of the ultrasound image enhancement processing system and its method of the present invention.

As illustrated in FIG. 4, it is a schematic flow chart of the first embodiment including the following steps:

(1) generating a first ultrasound original image file through a first ultrasound device 401;

(2) receiving the first ultrasound original image file through a server apparatus, and processing the first ultrasound original image file through a speckle reduction algorithm to generate a first processed image file 402;

(3) performing deep learning training on the first ultrasound original image file and the first processed image file to generate a first neural network model 403;

(4) inputting the first ultrasound original image file into the first neural network model to output a first speckle reduction enhancement image file, wherein the image content of the first speckle reduction enhancement image file is approximating to the image content of the first processed image file 404.

Different ultrasound devices may have slightly different image characteristics due to differences in hardware and front-end image processing methods.

Figure 5A:
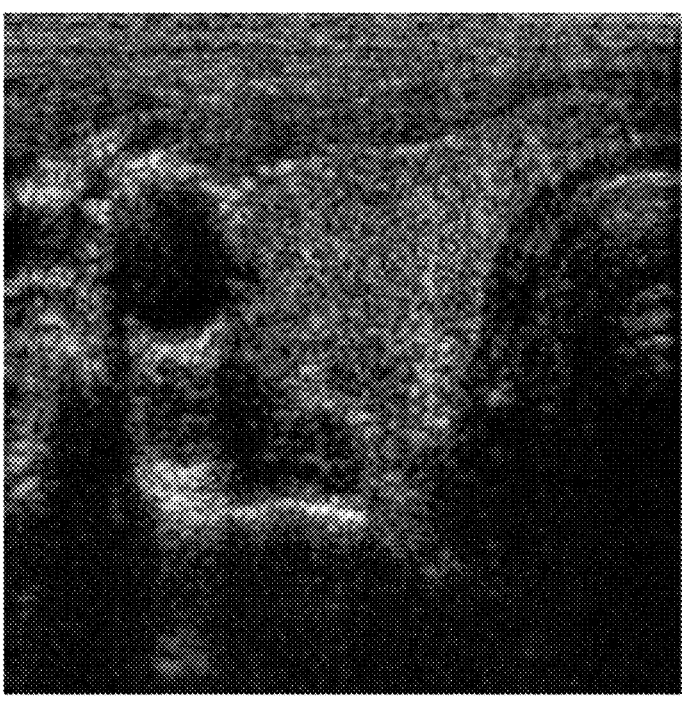
FIG. 5A is a schematic diagram of the image content of the first ultrasound original image file of the ultrasound image enhancement processing system and its method of the present invention.

As illustrated in FIG. 5A, it is the image content of the first ultrasound original image file.

Figure 5B:
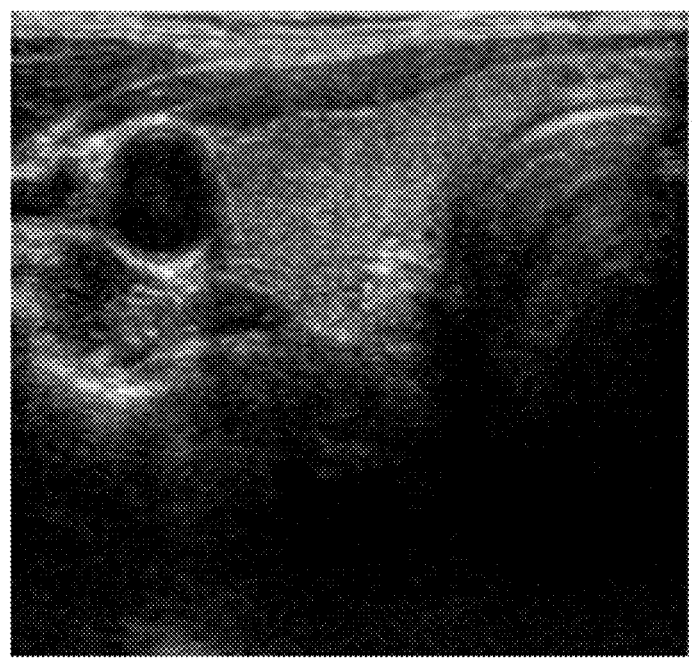
FIG. 5B is a schematic diagram of the image content of the second ultrasound original image file of the ultrasound image enhancement processing system and its method of the present invention.

As illustrated in FIG. 5B, it is the image content of the second ultrasound original image file.

When the image processing method designed and developed for the existing ultrasound device is applied to a new ultrasound device, as illustrated in FIG. 5A (existing ultrasound device) and FIG. 5B (new ultrasound device), the processing effect may not be ideal (for example, insufficient contrast or insufficient smoothness). Therefore, it may not be appropriate to use the neural network trained by the existing ultrasound device directly on the images output by the new ultrasound device.

Therefore, in response to the above situation, regarding the subject application, the existing neural network trained by the output image of the existing ultrasound device can be applied to the image output by the new ultrasound device. Afterwards, the output image of the existing neural network is then processed by the software to output a secondary reinforced image (the software is used to improve specific image characteristics), and the new neural network is trained with the secondary reinforced image so that the new neural network can learn the additional improvement.

Figure 6A:
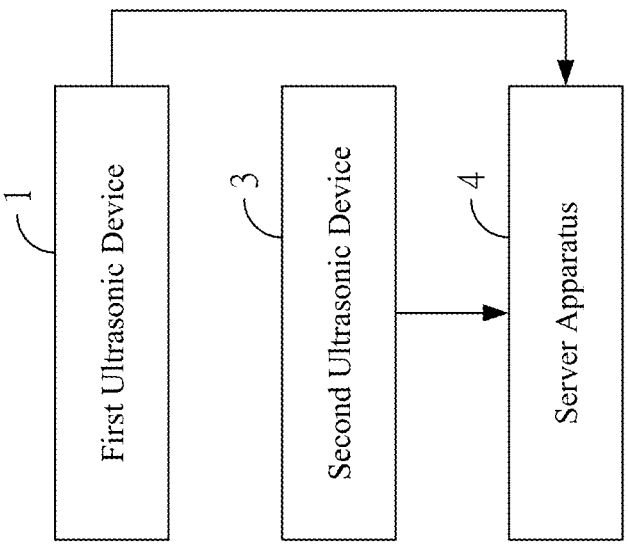
FIG. 6A is a schematic diagram of the overall structure according to the second embodiment of the ultrasound image enhancement processing system and its method of the present invention.

Therefore, in another embodiment of the subject application as shown in FIG. 6A, the ultrasound image enhancement processing system includes a first ultrasound device 1, a second ultrasound device 3, and a server apparatus 4.

The first ultrasound device 1 is capable of scanning organs to generate a first ultrasound original image file (X1) and transmitting the first ultrasound original image file (X1) to the server apparatus 2 in a wireless or wired manner.

The second ultrasound device 3 is capable of scanning organs to generate a second ultrasound original image file (X2) and transmitting the second ultrasound original image file (X2) to the server apparatus 2 in a wireless or wired manner.

The physical dimensions photographed by the first ultrasound device 1 and the second ultrasound device 3 should be of a similar scale (for example, in the range of 5-15 cm).

Figure 6B:
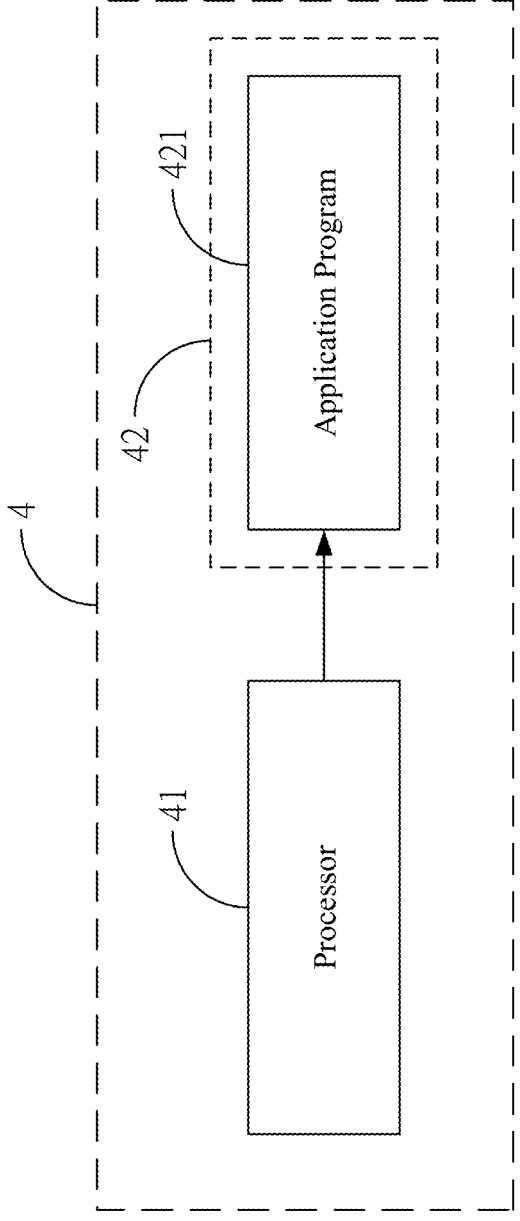
FIG. 6B is a schematic diagram of the server apparatus according to the second embodiment of the ultrasound image enhancement processing system and its method of the present invention.

As illustrated in FIG. 6B, the server apparatus 4 includes at least one processor 41 and at least one computer-readable recording medium 42. The computer-readable recording medium 42 stores at least one application program 421. The computer-readable recording medium 42 further stores computer-readable instructions. When the computer-readable instructions are executed by the processors 41, the application program 421 can be operated accordingly.

Figure 6C:
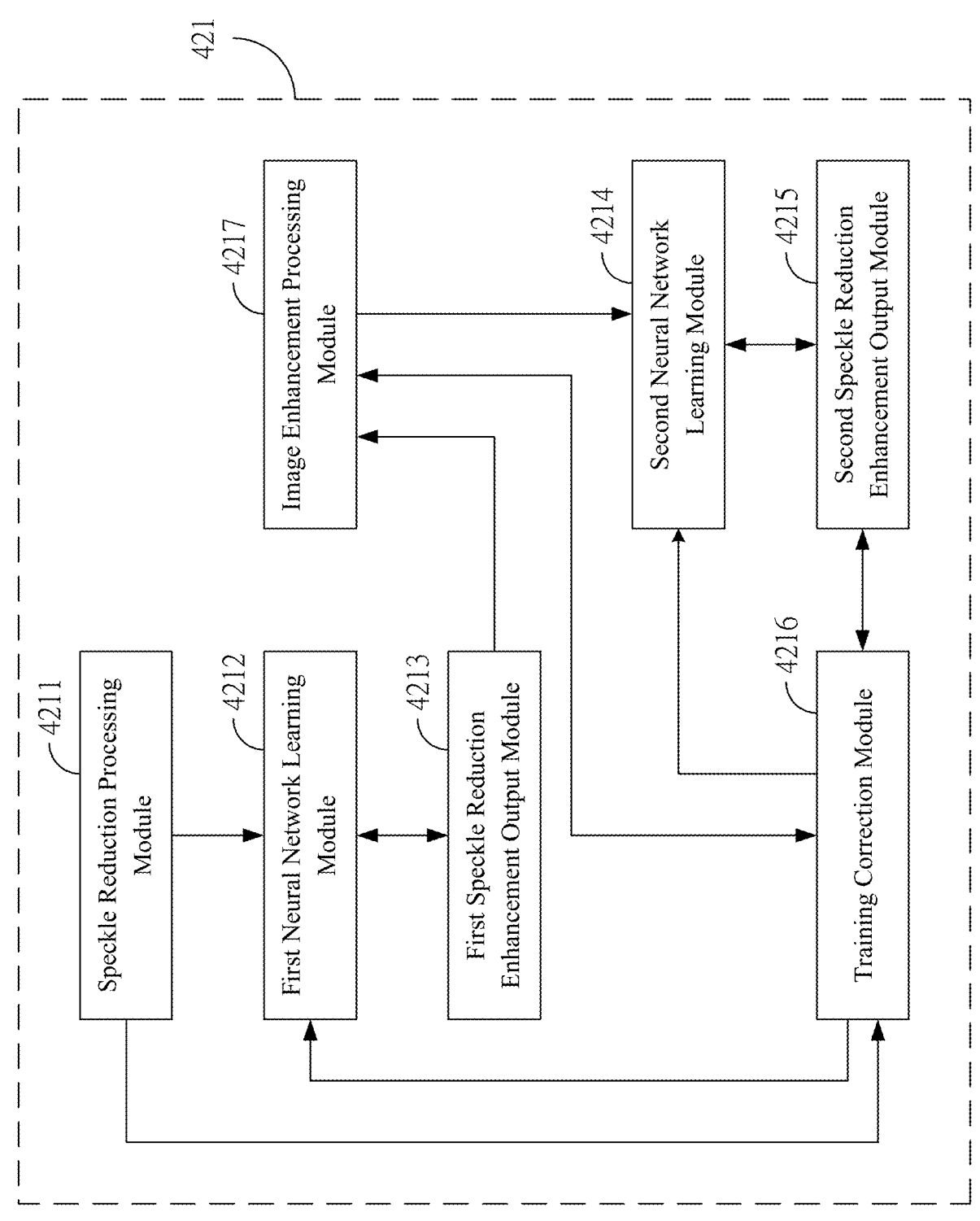
FIG. 6C is a schematic diagram of the application program according to the second embodiment of the ultrasound image enhancement processing system and its method of the present invention.

As illustrated in FIG. 6C, the application program 421 includes a speckle reduction processing module 4211, a first neural network learning module 4212, a first speckle reduction enhancement output module 4213, a second neural network learning module 4214, a second speckle reduction enhancement output module 4215, a training correction module 4216, and an image enhancement processing module 4217.

The speckle reduction processing module 4211 is used for processing the first ultrasound original image file through a speckle reduction algorithm to generate a first processed image file (Y1).

The first neural network learning module 4212 is connected to the speckle reduction processing module 4211 to perform deep learning on the first ultrasound original image file (X1) and the first processed image file (Y1) for training the convolutional neural network to generate a first neural network model.

The first speckle reduction enhancement output module 4213 is connected to the first neural network learning module 4212 for inputting the first ultrasound original image file (X1) into the first neural network model to output a first speckle reduction enhancement image file (Z1) (the image content of the first speckle reduction enhancement image file is approximating to the image content of the first processed image file) and inputting the second ultrasound original image file (X2) into the first neural network model to output a second processed image file (Y2).

The image enhancement processing module 4217 is used for processing the second processed image file through an image enhancement algorithm to generate a third processed image file.

For the interpretation of clinical ultrasound images, different image characteristics may need to be enhanced according to different human organs/parts, such as line continuity, contrast, smoothness, and enhancement characteristics.

Figure 7A:
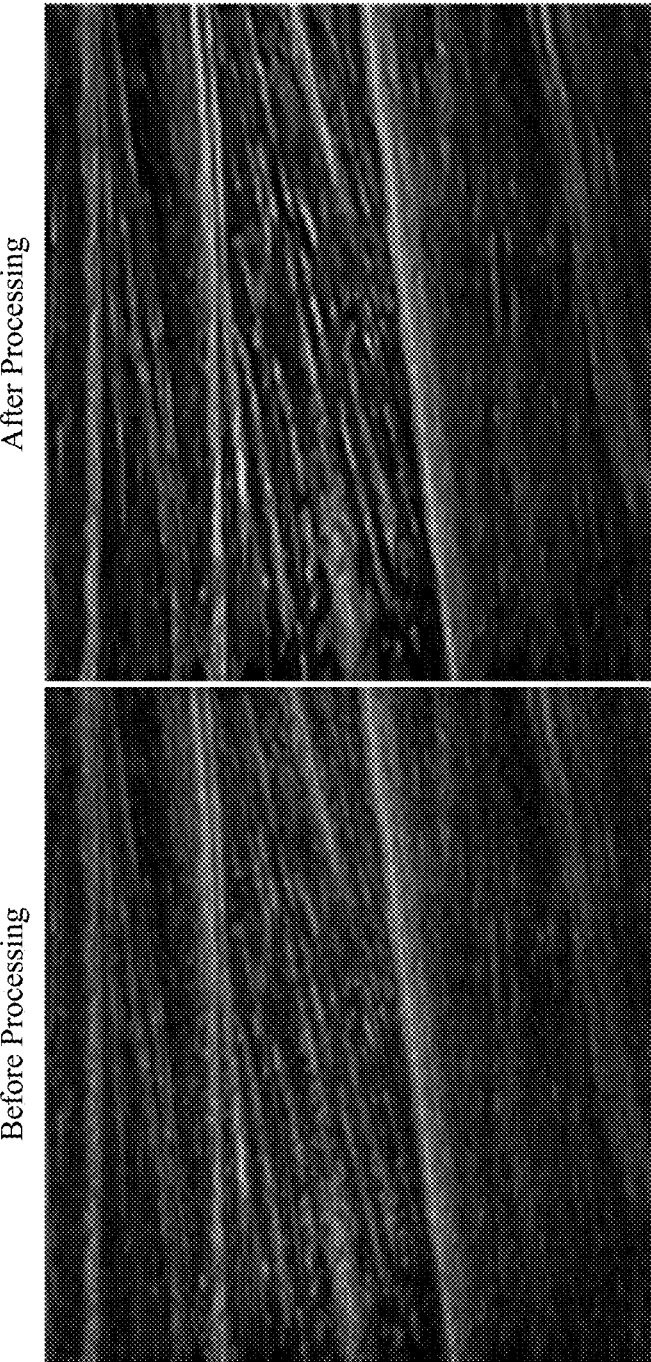
FIG. 7A is a schematic diagram before and after the enhancement treatment of line intensity and line connectivity of the ultrasound image enhancement processing system and its method of the present invention.

As illustrated in FIG. 7A, it is a schematic diagram before and after the enhancement treatment of line intensity and line connectivity.

Figure 7B:
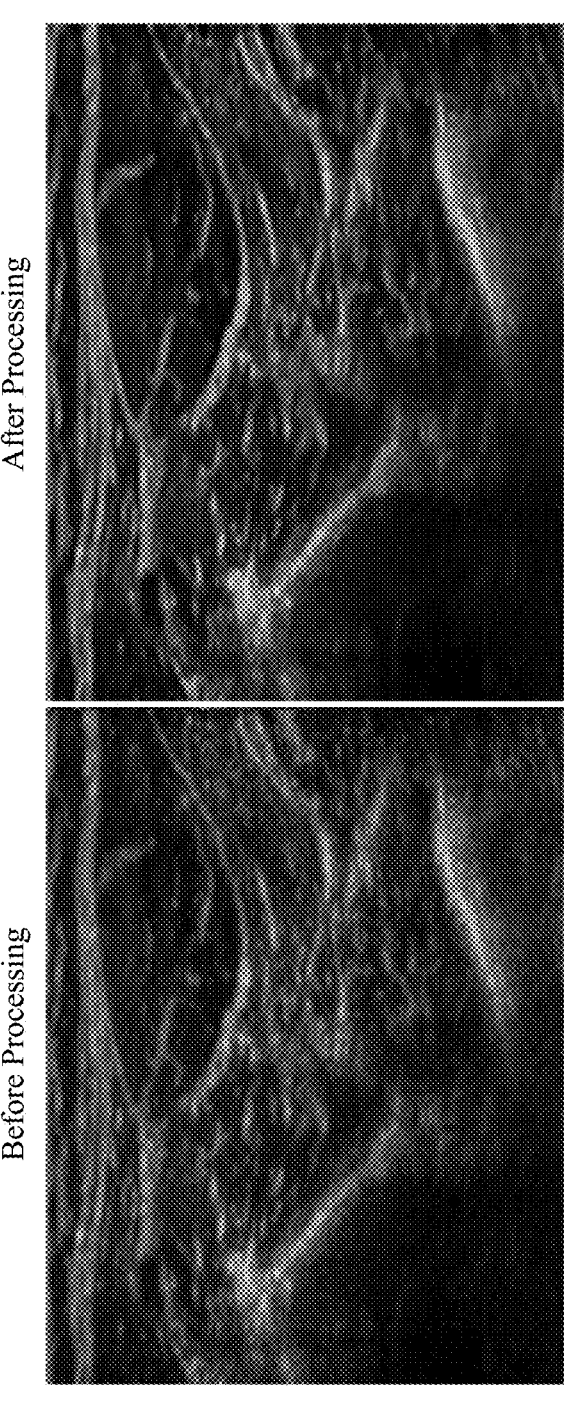
FIG. 7B is a schematic diagram before and after the enhancement treatment of contrast intensity of the ultrasound image enhancement processing system and its method of the present invention.
Figure 7B:

As illustrated in FIG. 7B, it is a schematic diagram before and after the enhancement treatment of contrast intensity.

Figure 7C:
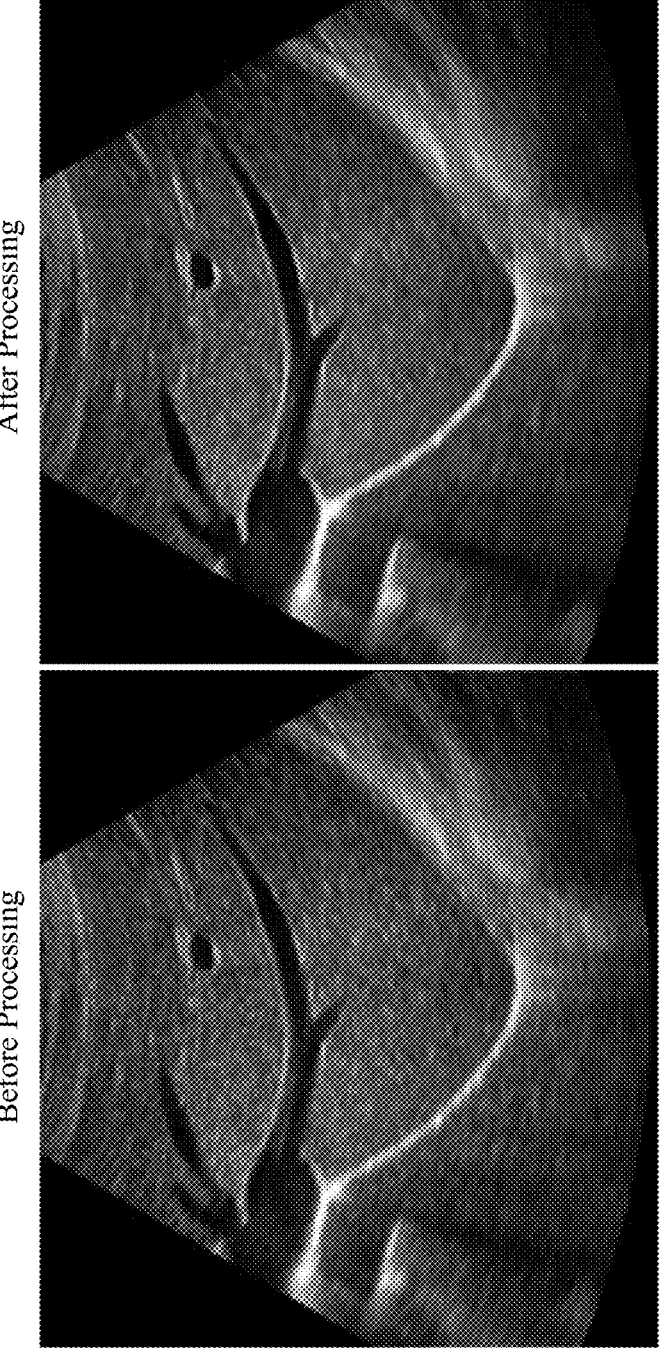
FIG. 7C is a schematic diagram before and after the enhancement treatment of smoothness of the ultrasound image enhancement processing system and its method of the present invention.

As illustrated in FIG. 7C, it is a schematic diagram before and after the enhancement treatment of smoothness.

Regarding the image content of the second processed image file (Y2), the image content of Y2 images is evaluated by a professional. If a specific enhancement requirement is met and the quality of the Y2 image is sufficient, no further model adjustment is required.

If the quality of the image is insufficient, based on specific enhancement requirements such as line continuity, contrast, and smoothness, multiple second processed image files (Y2) will be reprocessed by using image enhancement algorithms (either using traditional image processing or deep learning models) to generate multiple third processed image files (Y3) subsequently.

The second neural network learning module 4214 is connected to the first speckle reduction enhancement output module 4213 to perform deep learning on the second ultrasound original image file (X2) and the third processed image file (Y3) for training the convolutional neural network to generate a second neural network model.

The second speckle reduction enhancement output module 4215 is connected to the second neural network learning module 4214 for inputting the second ultrasound original image file (X2) into the second neural network model to output a second speckle reduction enhancement image file (Z2). The image content of the second speckle reduction enhancement image file (Z2) is approximating to the image content of the third processed image file (Y3).

The training correction module 4216 is connected to the first neural network learning module 4212, the first speckle reduction enhancement output module 4213, the second neural network learning module 4214 and the second speckle reduction enhancement output module 4215. The training correction module 4216 is used to normalize the first processed image file (Y1), the first speckle reduction enhancement image file (Z1), the third processed image file (Y3) and the second speckle reduction enhancement image file (Z2), and then it calculates the loss function respectively for the first processed image file (Y1), the first speckle reduction enhancement image file (Z1), the third processed image file (Y3) and the second speckle reduction enhancement image file (Z2). In which, the loss function is calculated by dividing the image into small blocks and then comparing the structural similarity to evaluate the first neural network model and the learning error value of the first neural network model.

The first neural network model and the second neural network model may be neural networks with the same structure, and have the same training method, but are not limited thereto.

Figure 8:
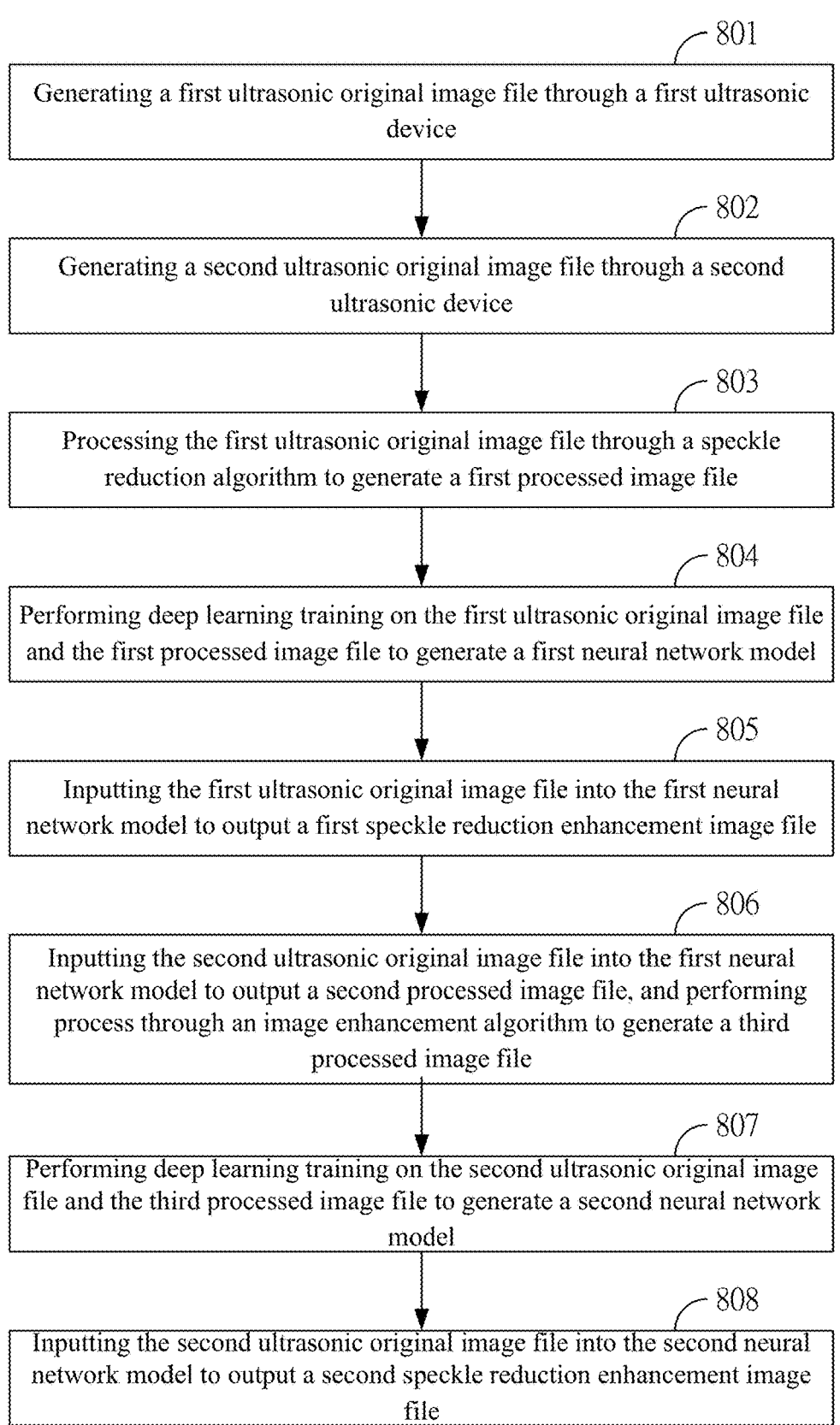
FIG. 8 is a schematic flow chart of the second embodiment of the ultrasound image enhancement processing system and its method of the present invention.

As illustrated in FIG. 8, it is a schematic flow chart of the second embodiment including the following steps:

(1) generating a first ultrasound original image file through a first ultrasound device 801;

(2) generating a second ultrasound original image file through a second ultrasound device 802;

(3) receiving the first ultrasound original image file and the second ultrasound original image file through a server apparatus, and processing the first ultrasound original image file through a speckle reduction algorithm to generate a first processed image file 803;

(4) performing deep learning training on the first ultrasound original image file and the first processed image file to generate a first neural network model 804;

(5) inputting the first ultrasound original image file into the first neural network model to output a first speckle reduction enhancement image file, wherein the image content of the first speckle reduction enhancement image file is approximating to the image content of the first processed image file 805;

(6) inputting the second ultrasound original image file into the first neural network model to output a second processed image file, and processing the second processed image file through an image enhancement algorithm to generate a third processed image file 806;

(7) performing deep learning training on the second ultrasound original image file and the third processed image file to generate a second neural network model 807;

(8) inputting the second ultrasound original image file into the second neural network model to output a second speckle reduction enhancement image file 808.

Compared with other conventional technologies, the ultrasound image enhancement processing system and its method provided by the present invention provide the following advantages:

(1) The present invention allows the neural network to learn the behavior of the ultrasound image enhancement algorithm through deep learning, converting multiple steps into a single model inference, which can be benefited from hardware acceleration.

(2) The technology provided by the present invention can achieve the effect that requires multiple steps by using a single neural network, potentially reducing computation time.

(3) The present invention utilizes the same neural network for learning additional improvement without spending additional inference time.

(4) The present invention can further convert the model into a common format of the neural network, such as ONNX format, and apply it to other hardware platforms that support deep learning acceleration. Reducing the difficulty of porting algorithms to edge devices and decreases the development time.

The present invention has been disclosed by the foregoing embodiments, which are not intended to limit the invention. Any person of ordinary knowledge in the art may make certain changes and modifications in understanding the foregoing technical features and embodiments of the present invention without departing from the spirit and scope of the present invention. Accordingly, the scope of patent protection for the invention shall be as defined in the claim attached hereto.

REFERENCE NUMERALS

1: first ultrasound device
2: server apparatus
21: processor
22: computer-readable recording medium
221: application program
2211: speckle reduction processing module
2212: first neural network learning module
2213: first speckle reduction enhancement output module
2214: training correction module
3: second ultrasound device
4: server apparatus
41: processor
42: computer-readable recording medium
421: application program
4211: speckle reduction processing module
4212: first neural network learning module
4213: first speckle reduction enhancement output module
4214: second neural network learning module
4215: second speckle reduction enhancement output module
4216: training correction module
4217: image enhancement processing module
What is claimed is:

1. An ultrasound image enhancement processing system, comprising:

at least one first ultrasound device, used to generate a first ultrasound original image file;

at least one server apparatus, used to receive the first ultrasound original image file, wherein the server apparatus at least comprises:

a speckle reduction processing module, used to process the first ultrasound original image file through a speckle reduction algorithm to generate a first processed image file;

a first neural network learning module, connected to the speckle reduction processing module, performing a deep learning training on the first ultrasound original image file and the first processed image file to generate a first neural network model;

a first speckle reduction enhancement output module, connected to the first neural network learning module, used to input the first ultrasound original image file into the first neural network model to output a first speckle reduction enhancement image file; and a training correction module connected to the speckle reduction processing module, the first neural network learning module and the first speckle reduction enhancement output module, wherein the training correction module is used to calculate a loss function after normalizing the first processed image file and the first speckle reduction enhancement image file, and the loss function is calculated by dividing the image into small blocks and then comparing the structural similarity to evaluate a learning error value of the first neural network model.

2. The ultrasound image enhancement processing system according to claim 1, wherein image content of the first speckle reduction enhancement image file is approximating to image content of the first processed image file.

3. The ultrasound image enhancement processing system according to claim 1, wherein the speckle reduction algorithm is an algorithm constructed based on an image processing theory or composed of a series of algorithms.

4. An ultrasound image enhancement processing system, comprising:

at least one first ultrasound device, used to generate a first ultrasound original image file;

at least one second ultrasound device, used to generate a second ultrasound original image file;

at least one server apparatus, used to receive the first ultrasound original image file and the second ultrasound original image file, wherein the server apparatus at least comprises:

a speckle reduction processing module, used to process the first ultrasound original image file through a speckle reduction algorithm to generate a first processed image file;

a first neural network learning module, connected to the speckle reduction processing module, performing a deep learning training on the first ultrasound original image file and the first processed image file to generate a first neural network model;

a first speckle reduction enhancement output module, connected to the first neural network learning module, used to input the first ultrasound original image file into the first neural network model to output a first speckle reduction enhancement image file, and input the second ultrasound original image file into the first neural network model to output a second processed image file;

an image enhancement processing module, connected to the first speckle reduction enhancement output module, used to process the second processed image file through an image enhancement algorithm to generate a third processed image file;

a second neural network learning module, connected to the first speckle reduction enhancement output module, used to perform a deep learning training on the second ultrasound original image file and the third processed image file to generate a second neural network model;

a second speckle reduction enhancement output module, connected to the second neural network learning module, used to input the second ultrasound original image file into the second neural network model to output a second speckle reduction enhancement image file; and a training correction module connected to the speckle reduction processing module, the first neural network learning module, the first speckle reduction enhancement output module, the image enhancement processing module, the second neural network learning module and the second speckle reduction enhancement output module, wherein the training correction module is used to calculate a loss function respectively for the first processed image file, the first speckle reduction enhancement image file, the third processed image file and the second speckle reduction enhancement image file after normalizing the first processed image file, the first speckle reduction enhancement image file, the third processed image file and the second speckle reduction enhancement image file, wherein the loss function is calculated by dividing the image into small blocks and then comparing the structural similarity to evaluate the first neural network model and a learning error value of the first neural network model.

5. The ultrasound image enhancement processing system according to claim 4, wherein image content of the first speckle reduction enhancement image file is approximating to image content of the first processed image file, and image content of the second speckle reduction enhancement image file is approximating to image content of the third processed image file.

6. The ultrasound image enhancement processing system according to claim 4, wherein the image enhancement algorithm uses a traditional image processing method or a deep learning model to perform image processing on the second processed image file to generate the third processed image file.

7. An ultrasound image enhancement processing method of the ultrasound image enhancement processing system according to claim 1, comprising steps of:

generating a first ultrasound original image file through a first ultrasound device;

receiving the first ultrasound original image file through a server apparatus, and processing the first ultrasound original image file through a speckle reduction algorithm to generate a first processed image file;

performing a deep learning training on the first ultrasound original image file and the first processed image file to generate a first neural network model;

inputting the first ultrasound original image file into the first neural network model to output a first speckle reduction enhancement image file, wherein image content of the first speckle reduction enhancement image file is approximating to image content of the first processed image file.

8. An ultrasound image enhancement processing method of the ultrasound image enhancement processing system according to claim 4, comprising steps of:

generating a first ultrasound original image file through a first ultrasound device;

generating a second ultrasound original image file through a second ultrasound device;

receiving the first ultrasound original image file and the second ultrasound original image file through a server apparatus, and processing the first ultrasound original image file through a speckle reduction algorithm to generate a first processed image file;

performing deep learning training on the first ultrasound original image file and the first processed image file to generate a first neural network model;

inputting the first ultrasound original image file into the first neural network model to output a first speckle reduction enhancement image file, wherein the image content of the first speckle reduction enhancement image file is approximating to the image content of the first processed image file;

inputting the second ultrasound original image file into the first neural network model to output a second processed image file, and processing the second processed image file through an image enhancement algorithm to generate a third processed image file;

performing deep learning training on the second ultrasound original image file and the third processed image file to generate a second neural network model;

inputting the second ultrasound original image file into the second neural network model to output a second speckle reduction enhancement image file, wherein the image content of the second speckle reduction enhancement image file is approximating to the image content of the third processed image file.

* * * * *